United States Patent
Henriksson et al.

[11] Patent Number: 6,052,381
[45] Date of Patent: Apr. 18, 2000

[54] ARRANGEMENT AND METHOD FOR COMMUNICATION

[75] Inventors: Hans-Jörgen Henriksson, Stockholm; Tad Gruber, Sollentuna, both of Sweden

[73] Assignee: PC Card Distributions, Skandinavien AB, Solna, Sweden

[21] Appl. No.: 08/945,011

[22] PCT Filed: Feb. 14, 1997

[86] PCT No.: PCT/SE97/00244

§ 371 Date: Jan. 9, 1998

§ 102(e) Date: Jan. 9, 1998

[87] PCT Pub. No.: WO97/30396

PCT Pub. Date: Aug. 21, 1997

[30] Foreign Application Priority Data

Feb. 16, 1996 [SE] Sweden .................................. 9600599

[51] Int. Cl.[7] .................................. H04J 3/22; H04J 3/12
[52] U.S. Cl. .......................... 370/465; 370/914; 710/52; 710/62; 710/103
[58] Field of Search ...................... 370/552, 543, 370/545, 914, 465; 710/52, 60, 61, 62, 101, 102, 103, 9, 129, 105, 14; 395/882, 828, 834, 872; 375/222

[56] References Cited

U.S. PATENT DOCUMENTS

| 5,404,493 | 4/1995 | Bolme et al. | 710/62 |
| 5,530,718 | 6/1996 | Gradeler et al. | 375/222 |
| 5,671,374 | 9/1997 | Postman et al. | 710/103 |
| 5,751,741 | 5/1998 | Voith et al. | 370/914 |
| 5,978,862 | 11/1999 | Kou et al. | 710/14 |

*Primary Examiner*—Alpus H. Hsu
*Assistant Examiner*—Afsar M. Qureshi
*Attorney, Agent, or Firm*—Pillsbury Madison & Sutro LLP

[57] ABSTRACT

The invention relates to an adapter (10) and a method for a communication card (20), preferably a PCMCIA card, comprising communication electronics by means of a host unit (18) I/O port. The adapter (10) automatically configures the communication card (20) and initiates an automatic connection to a connected host unit with the power supply on, so-called power on. Moreover, it transmits data transparently between the card (20) and the host unit (18) in perceiving changes in data speed and in data format.

16 Claims, 2 Drawing Sheets

ARRANGEMENT AND METHOD FOR COMMUNICATION

This application is the national phase of international application PCT/SE97/00244, filed Feb. 14, 1997 which designated the U.S.

TECHNICAL FIELD

The present invention relates to an adapter with specific modes and such an adapter in a specific embodiment and to a method for communications cards including communication, electronics, the adapter including an intelligence for an automatic information transfer between cards arranged in the adapter and a host unit and, vice versa, by means of one of the host unit I/O ports. More specifically, the adapter is used to establish a communication to the host unit by means of one of its serial I/O ports via a PMCIA card with a communication function provided in the adapter. The invention provides also the possibility to change the baud speed during a prevailing communication.

STATE OF THE ART

PMCIA cards (Personal Computer Memory Card Association) were developed as a standard in various physical dimensions for an extra memory space for computers. However, it was soon realized that the relatively small card dimensions are exceptionally adaptable to be integrated in electronics in form of modems, radio wave receivers and transmitters, etc.

The communication between a PMCIA card and a host unit, possibly a computer, a mobile telephone, etc. is provided by a set up of pins or contacts on the card, connected to a corresponding one in the host unit. In the host unit a socket is installed with a card holder, generally reassembling a data disk socket, but adapted to the PMCIA card dimensions.

In this case a problem arises related to computers without any PMCIA connection, i.e. the card must in some way be installed externally for letting the host unit make use of the card.

Moreover, with respect to the electronics possibly integrated in a card it is not sufficient only to connect the card to a host unit. The host unit must also be configured to receive and execute commands related to the card. The first mentioned is more or less complicated and with today price situation for e.g. computers it might be difficult to motivate a reconstruction or a software updating of the host unit with respect to the corresponding costs.

Moreover, communication cards in today market are configured by means of commands from the host unit, i.e. not automatically when connected to the host unit, so-called plug and play. Communication cards might comprise electronics for GSM (Global System For Mobile Communication)—interfaces, modem cards, GPS (Global Positioning System), Mobitex, pagers etc. Techniques communicating with UART units and via RS-232 interfaces.

A PCT application WO-A1-95130191 describes a device and a method for a remote connection to a computer network by means of PMCIA modem components possibly connecting multiple modems to a network. The above mentioned application is missing the unique properties to automatically follow baud speed changes.

In its description it is also referred to a programme actually exiting and initiating the modem in discovering any modem in a port, this being a standard according to the PMCIA-organization, the invention here not providing anything new or patentable. In this way everyone is proceeding when using a PCMCIA card. However it is not previously known to dynamically scan the transmission speed, when needed during a transmission, herein below called autobauding. In the above mentioned application the speed is adjusted during the initiation and remains at the adjusted value.

SUMMARY OF THE INVENTION

An object of the present invention is to provide an adapter for communication cards comprising electronics, the adapter by means of an internal intelligence automatically initiating the communication card and automatically connecting it to a host unit for a change of information between the adapter—with or without a card—and the host unit when the power supply is connected, so-called power on.

A further object of the invention is to provide transparent data transmission and simultaneously exploring changes in data speed (autobauding) and data format.

Further, an object of the invention is to detect so-called dangerous data bit combinations during a data transmission to the adapter in such a way that any transmitted data might be interpreted as commands to the adapter, the adapter then identifying such bit combinations and transmitting them to the card without being interpreted as control commands for the adapter.

Moreover, the adapter comprises a RAM-memory which is not erased during a power supply failure. The RAM memory consists of a so-called NOVRAM (non volatile RAM). The NOVRAM allows the parameter settings to be sustained during a power supply disconnection.

Moreover, the invention relates to a unique method for reading CIS-information from a communication cards attribute memory in that only a few bytes need to be read from the memory to be accepted as being correct CIS-information.

To solve above mentioned problems and for achieving the objects of the invention an adapter for communication cards is provided comprising communication electronics, the adapter then comprising an card initiating and automatic data and command transmitting intelligence between cards inserted in the adapter and a host unit and vice versa by means of one of the host unit I/O-ports.

The adapter comprises a processor connected to memory units, a timer, a serial communication unit, a communication mode indicating means, a serial interface for connecting it to the host units I/O-port and a card holder for said card.

The processor further comprises means generating signals for maintaining and controlling automatic data and command transmission in case of data speed changes during prevailing transmission by generating signals from an actually activated adapter mode for a subsequent activating of another adapter mode as follows:

a mode with means for an automatic adapter activation during a power switch-on and a communication initiation between the adapter and the host unit, when the adapter is switched on together with the host unit for emitting a command signal to the host unit, when it is ready to receive a command, during which a mode is activated with means for detecting an inserted card and for receiving commands from the host unit, initiating the execution of detected received allowable commands according to a table in a memory unit, the detection then again being activated whether the command is allowable or not, but if a card is detected after its application a card resetting signal is activated, whereafter a mode is activated with a CIS-table in the attribute memory controlling means to control the table for searching after a table entering tuple, thus being assumed that the actual CIS-table in the attribute memory does not start with zero tuples, this being repeated a predetermined number of times when receiving zero tuples, the adapter then entering a waiting loop and the detecting mode then being activated, if the card is removed from the card holder, whereas the tuples having a zero value the attribute memory is scanned with a predetermined number of bytes not surpassing the total number of bytes accessible in the attribute memory, said table entering tuples has to be identified within said predetermined number of bytes, the CIS-table then being accepted to be correct, but if the table entering tuple is not identified said controlling mode is again activated, if said predetermined number of times have not been repeated, the adapter then entering said waiting loop, but if on the contrary the table input tuple has been identified within said predetermined repetition the card is configured with the CIS-values by means of a configuration register and a time delay is initiated to prevent any card interlocking, whereafter the serial communication unit is configured, whereby:

a mode is activated with control means for checking if the card is answering signals from the host units communication ports and the configuration of the serial communication unit is repeated a predetermined number of times, if the card does not answer any signals, and if no answer is received upon signals, the adapter enters said waiting loop, this being interrupted, if the card is removed from the card holder, but if the card answers to signals, a mode is activated with monitoring means to detect, if data signals are sent from the host unit and the card, respectively, emitting the data to the card and the host unit, respectively, for further data management, then after each performed detection in the communication directions, i.e. host unit towards card and card towards host unit, respectively, a control performs the end, with a control of the card still being inserted in the card holder unit, and if not so, the detecting mode is activated, otherwise the present detecting mode is repeated, the adapter simultaneously monitoring and managing bit combination resembling commands as to its data contents during data transmission.

In an embodiment, moreover, said bit combinations are stored in a data base in the adapter, the adapter comparing these with the received bit combination and allowing the bit combination to be transferred to the card, if a correspondence is achieved when comparing.

In an embodiment is anticipated that at least one of the host units communication ports is specified in a CIS-table, then being anticipated that the communication card is computer compatible without any special control.

The adapter might also comprise a RAM-memory maintaining stored information in spite of the power supply to the adapter is cut off, the adapter then keeping the parameter settings intact.

Furthermore, the adapter might comprise an inserted battery power supply, thus being independent of an external power supply.

The adapter will become power saving, when provided with a DC/DC-transducer. The device for the communication status can for a communication status indication provide monitoring signals for certain specific adapter modes to indicate events in the adapter asking for the users attention by means of a LED-indication and a sound signal from a loudspeaker comprised in the adapter.

The present invention comprises also a specific embodiment with its mode not being affected, and a method to achieve the above mentioned functions in the adapter.

BRIEF DESCRIPTION OF THE DRAWING FIGURES

For a better understanding of the embodiments of the present invention as to the content of the description it is referred to the attached figures in the drawings, where.

DETAILED DESCRIPTION OF PREFERRED EMBODIMENTS

The present invention relates to an intelligent adapter for preferably PCMCIA communication cards. It provides on one hand hardware and software interfaces for communication cards and on the other hand e.g. RS-232 serial interfaces and provides communication card connections to serial communication ports on any computer whatsoever.

The adapter can in a stand alone mode with regard to the host unit initiate cards, perform control operations, etc.

In the following it is for the sake of clarity anticipated that the communication card refers in the present embodiments to a modem communication card.

The embodiments of the present invention are here below described in detail with reference to FIGS. 1 and 2, FIG. 1 in a block diagram schematically illustrating a card adapter with build-in electronics for communication transfer. The adapter is of the so-called plug and play—type, automatically establishing communication to a connected host unit. The host unit thus does not need any special software to communicate with the adapter. When commands are initiated to change parameters in the adapter in special situations this is achieved by means of the host units terminal emulator towards the host units serial ports by means of an AT-standard for communication, achieved e.g. by pressing keys on the host unit keyboard in accordance with the adapter manual.

Figure 1:
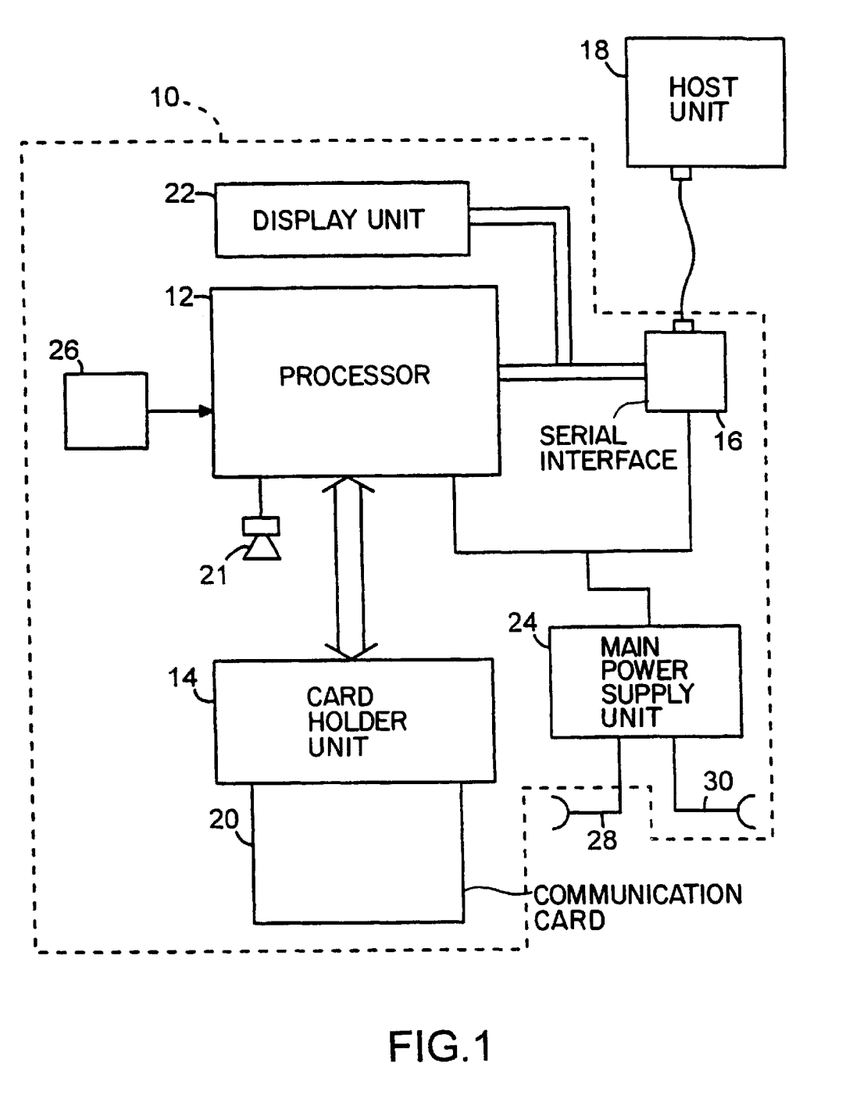
FIG. 1 schematically shows the adapter according to the invention in a block diagram.

According to one embodiment of the invention the adapter 10 consists in accordance with FIG. 1 of a standard PCMCIA card holder 14 EIA-232D with 9 pins and a serial port connection according to AT-standards. AT means Advanced Technology referring to a 16 bit host systems computer architecture being the base of the ISA-bus definition. Modems are generally controlled by means of two different command sets, AT- or Hayes® commands and V.25 bis commands specified by CCITT.

Furthermore, the adapter consists of a one chip computer 12, e.g. a microcomputer in the Hitachi H8/300 series with internal RAM and ROM memories, timers, UART units, etc. as well as LED:s, here indicated by a display 22, and a loudspeaker 21, used for adapter mode status indication, the firmware in the micro-computer and the present hardware activating the adapters physical communication mode. The status is preferably shown by means of 6 LED 22 and the internal loudspeaker 21 is used for an extra status indication and for monitoring modem communication tones. In the present invention the following status indicating LEDs exist:

TXD transmit data (from host unit)

RXD received data (from the communication card)

DCD Data Carrier Detect (carrier wave detection)
DTR Data Terminal Ready
RI Ring Indicator
PWR Power (or better modem installed)

The first two diodes (LEDs) are hardware controlled. The remaining four are software controlled and show signals detected by UART units, DCD and RI being communication card signals, whereas DTR is generated by the host unit 18 with the exception of the PWR signal indicating the identification of an admitted communication card 20 in the card holder 14 and being configured and that finally its UART has been initiated. Hence, when the PWR diode is active, the modem 20 is ready for communication.

The adapter 10 comprises also a RS-232 interface drive 16 for communication between a host unit 18, e.g. a PC computer or another computer, via a serial RS-232 cable. Moreover, there is a resetting means 26 for the communication card. A reset performs e.g. an unlocking of a communication card, when it for some reason has been locked or got caught. The reset is often required when resetting the apparatus to a start position.

The adapter 10 comprises as an advantageous alternative a main power supply 24 to be connected between the external power supply 28 and the battery power supply 30. In an embodiment the adapter might be provided with a DC/DC transformer, the adapter when battery driven then possibly operating with voltages 6 V to 2.6 V resulting in an essentially improved use of the accessible battery power.

In FIG. 1 a PCMCIA communication card 20 is indicated, schematically shown inserted in the card holder 14.

With no communication card inserted in the card holder 14 of the adapter 10, the adapter operates in the so-called local mode. In this mode a limited group of commands is accessible with the object to control the communication status of the adapter 10 or for defining certain parameters.

Said parameters are stored in a non-volatile memory, a so-called NVRAM or NOVRAM.

The parameters remain in the NVRAM unit inspite of that the adapter power supply is cut off, this not being the case with a conventional RAM memory. The set adapter parameters might thus be read by the adapter 10 with its internal microprocessor 12, the adapter possibly continuing to operate in parity with the previous functions with the power supply on without any re-definiton of the parameters.

The adapter 10 detects automatically an inserted PCMCIA communication card and performs the procedure of recognition and initiation. If this is performed without any complications in a common way the adapter 10 assumes a transparent mode, i.e. a mode, where data can be shifted directly between a host unit 18 connected to the adapter 10 without any transformation, adaptation or interpretation of the transmitted data.

Local mode

The adapter 10 assumes the local mode each time it is supplied with power with or without an inserted communication card 20, or when it detects that the communication card 20 has been removed from the card holder 14. It then emits a command signal, a so-called prompt, or a question mark to the host unit 18 when it is ready to accept a new command. Any changes in speed or in format are initiated first when a new communication card 20 has been inserted. When a card 20 is removed from the adapter 10 the latest set-up of data speed and data format is active, not necessarily the default position.

When the adapter 10 does not comprise any NVRAM or has not been initiated the default parameters are used.

For changing the parameter settings in the adapter 10 the host unit communicates with the adapter 10 by means of said terminal emulator in cases when the default settings are not valid or when changes in the NVRAM memory are to be made.

Commands

The following commands might be used by the host unit in the local mode: auxiliary optional commands, baud rate, data format selection, autobaud, customized commands, power down delay, save NVRAM, LED tests, loopback tests, memory dumping and memory modification.

The command autobaud controls an included autobaud capacity. With the adapter 10 supplied with power the autobaud option is read from the NVRAM memory. It is generally necessary to insert it when using the AT-command standards, because the data in the RS-interface being defined via an AT-prefix, the adapter then have to recognise it and be adapted thereto in a correct way.

The autobaud command can generally be used to vary parameters in some of the other above mentioned commands.

When however using a V.25 bis command set or any other known command set and no changes in speed are required it is preferred to adjust necessary speed and data formats manually and to disconnect the autobaud option.

However, there exists a problem related to the autobaud option in that some of the character sequences are interpreted as being related to an at-/AT-prefix, thereby inducing undesired data format transactions or transmissions, and thereby distorting incoming data.

To avoid such a problem with twisted or distorted data some of the possible data format transmissions will be controlled against a data base or a table comprising data bit combinations being interpreted by the adapter as commands, in spite of being themselves data to be transmitted transparently to the communication card. Therefore, these bit combinations are not to be interpreted as commands and not to interrupt present data transmissions. According to the present invention this is solved advantageously in that said so-called dangerous bit combinations are compared with combinations of dangerous bit combinations stored in a table or in a data base. When the adapter comes across such a bit combination it controls it in the data base if it is accessible there, and if that is the case the bit combination is accepted and transferred as conventionally formatted data with the command similarity being ignored. This procedure is according to the present invention called semi-autobaud, there all forbidden dangerous data format transmissions being controlled to be accepted as not being commands.

The above mentioned power down delay directs the adapter into a so-called sleep mode, i.e. a power saving mode for the adapter is entered. Each time DTR signals (Data Terminal Ready—signals) are not present in the RS connection a special timer is activated counting the time down to a power down. This facility is only accessible with the adapter 10 being power supplied by a battery with the object to save power.

The above mentioned reset command for testing the autobaud and the data integrity resembles very much the usual data emitting and receiving loops. The main difference is that during the test no communication card is connected and to the adapter 10 incoming data are directly sent to the host unit 18. If necessary, the autobaud might then be disconnected. This mode has been implemented for an internal autobaud detection and data integrity test and is not intended to be used by the user. The test is completed by inserting and removing the communication card.

Transparent mode

The main task of the adapter 10 is to transmit data from the serial port on the host side to the PCMCIA modem and vice versa. Thus, data must be transmitted totally transparently, i.e. without any intermediate treatment, with baud speed, number of data bits and parity as defined by the host unit 18. Then the basic question comes up, if data are to be treated transparently and simultaneously enable a registration of data speed and data format changes.

Therefore, the adapter 10 must always be prepared to recognise the baud rate and/or data format changes. According to the invention the AT command settings are used for this purpose to support the in PC computers most frequently used autobaud. Data being received by the adapter 10 are then controlled for each character to detect a-/A-characters in the AT-command settings. Independent of the test result the controlled character has to be transmitted to the PCM-CIA card. Even if the whole autobaud sequence consists of only two characters it is recommended not to wait for the second character as the emitting side might need this character as a part of a higher protocol level and the whole communication might get locked.

The baud speed and data format transmission identification is performed separately.

The following baud speeds are recognised by the adapter in the present embodiments: 1200, 2400, 4800, 7200, 9600, 14400 19200, 38400 and 57600 bps.

Moreover, the baud speeds 300, 28800 and 115200 bps can be entered via the local mode, not being supported via autobaud.

The adapter recognises the following data formats: 7N2, 7E1, 7O1, 7M1, 7S1, 8N1, 8E1 and 8O1, where N means no parity, E equal parity, O unequal parity, M marked parity (with the parity bit always set equal to 1), and S intermediate parity (with the parity bit always set equal to 0).

The data formats 7M1 and 7S1 are passive, i.e. they are accepted but not activated. None of them can be separated from its active equivalents. 7M1 is equivalent to 7N2 and 7S1 is equivalent to 8N1 for characters not more than 127 bits.

As previously mentioned data format transmissions are in some cases impossible to separate from ordinary data with a possible unability to detect them and a data integrity (data content) distortion or misrepresentation, i.e. undesirable data format changes depending on a faulty recognition on the holder side.

Thus, the present invention introduces a so-called semi-autobaud, in which all data format transmissions are controlled against a data base or a table in accordance with the discussion above. In this way the data integrity is preserved at the expense of a limited number of transmissions requested by the data base control.

The key characters for a misinterpretation is C1 (hex) and E1 (hex). Depending on the interpretation they might represent the real 8 bits C1/E1 characters or 7 bits a-/A-characters enforcing a data format change according to AT standards.

The table here below illustrates some possible misinterpretations and transmissions prevented by means of the semi-autobuad mode

| character | interpreted as | transmitted as |
| --- | --- | --- |
| C1 | 41 (A) | 8N → 7O (7N) |
|  |  | 8E → 7O (7N) |

-continued

| character | interpreted as | transmitted as |
| --- | --- | --- |
| E1 | 61 (a) | 8N → 7E (7N) |
|  |  | 8O → 7E (7N) |

In the same way the autobaud has limits. The data transmissions here below are always excluded, as there is no way to determine if they represent ordinary data or a at/AT sequence.

| Case | transmission | character |
| --- | --- | --- |
| AT | 8N → 7E | 41 D4 |
| AT | 8O → 7E | 41 D4 |
| at | 8N → 7O | 61 F4 |
| at | 8E → 7O | 61 F4 |

It must be observed that the above described transmissions are only controlled, if the baud speed remains unchanged. When the adapters 10 firmware detects a new baud speed it will be definitely a at/AT-sequence, there being no reason for keeping the data format transmissions controlled against the data base.

The autobaud and the semi-autobaud are always disconnected in the local mode and are always connected in the transparent mode, if they are not explicitly disconnected by means of the at-command. When the autobaud is connected it is under the following conditions not active:

when a new character arrives within 10 ms after the preceding one, if the CTS-signal (Clear To Send-signal) is disconnected.

These circumstances prevent any unnecessary control of the at/AT-sequences during a data transmission. Normally the distance between characters transmitted as formatted data is more than 10 ms. So, if a character is received within a 10 millisecond interval, it should be an AT command.

The autobaud is however always active after a positive recognition of an a/A, thus waiting for the other character from the a/A sequence, even if the CTS is down or a pause shorter than 10 ms exists between the characters.

The autobaud initial mode is defined by the NVRAM setting, but in case of a nonexisting NVRAM or a non initiated one, the adapter is forced into semi-autobaud, when a communication card 20 is inserted by connecting the power supply (power up). If, however, no communication card 20 is detected the adapter 10 activates the autobaud. This might of course be changed by means of a command in the local mode.

NVRAM interface

A serial interface has been provided to the 128 byte NVRAM memory. In the present embodiment of the firmware version (hardware based software) of the NVRAM memory it is used to store the following parameters: validation pattern, revision number, baud speed, data format, configuration flags for enforced semi-autobaud, configurations flags for connected CTS control and disconnection delay.

During the power supply sequence power up the presence of a NVRAM memory is controlled and evaluated. The evaluation pattern hex-value is read first and then compared with a hex-value. If these values are not identical this pattern is sent directly to the NVRAM memory instantly being read out to control the existence of a NVRAM memory. If the control does not confirm identical hex-values it is assumed that the NVRAM memory does not exist and the initiating parameters (default) are put into the existing RAM memory. Otherwise, if the NVRAM memory is assumed to exist but not being initiated an initiating procedure is started of the NVRAM memory according to the above specified parameters.

When the evaluation pattern is correct the NVRAM memory revision number is checked by means of the firmware number. If they do not coincide the initialisation is started. This is due to that the NVRAM memory contents must coincide with what is defined in the firmware.

If both the evaluation number and the revision number are correct all parameters are read from the NVRAM memory and are activated.

The same procedure is repeated each time when the for the moment present configuration is stored by means of a NVRAM storing command. If there is not any NVRAM memory an error message is given as a reply to the command.

Reset

A renewed initiation of the communication card 20 starts with a reset signal being activated after e.g. 100 ms, so that the card is positively unlocked (reset). The reset period is important as a too fast initiation might lock the card.

After a reset a card tone is generated to inform a card user that the card has been detected.

CIS recognition

After a reset the reading starts of the communication cards attribute memory concerning the CIS information. According to the invention a special setting of tests is implemented to evaluate the attribute memory contents. Some communication cards 20 require as much as 3.5 seconds to establish an access to the memory and meanwhile any nonsense information whatsoever might be read from the memory. Then it is assumed that the actual CIS table in (Card Information Structure, the CIS table comprises a data structure stored in a communication card and contains information of the card capacity and also of the data formatting and organisation, CIS data are stored in a so-called attribute memory in the communication card) the attribute memory does not begin with zero tuples. This provides the base for the first test the programme reading the CIS table running in a loop as long as the first two positions in the memory have zero value. If they after 5 seconds still have the value zero the evaluation is stopped with an error code being set.

If, however, the values are not zero the actual attribute memory scanning begins. The table input tuple for the default basic configuration must be read or recognised within the first 256 bytes for accepting the CIS table being correct, otherwise the process starts from the beginning, i.e. by controlling the first two positions. Thus, only a limited recognition of the CIS table is performed. The CIS table might have an optional length, but only the first 256 bytes of the present embodiment are controlled and recognised, i.e. the tuple (End-Of-List tuple) defining the end of the table is not required.

The above described Cis recognition procedure is repeated three times. With an error message after the third attempt the adapter plays by means of the loud speaker 21 an error signal, e.g. three short tones and enters a waiting loop until the communication card is removed.

Communication card configuration

During a configuration are only initiated the two first in the microcomputer 12 inserted configuration registers, one of them being a configuration option register being set by means of a configuration index taken from the CIS table and an interrupt determination in the register is set on a level mode. The configuration register and the status register are set by means of IO is 8 (a 8 bits data length) and audiobits are set.

UART configuration

UART (Universal Asynchronous Receiver/Transmitter) configuration provides a last phase step to establish access to the communication card 20. During this phase a power supplying status indicating diode PWR flashes in the diode unit 22. The UART configuration starts with a two second unconditional delay followed by a UART initiation. The delay is chosen being the easiest and safest way to avoid problems with modems emitting non recognizable data or modems being locked in being initiated too early.

The UART unit is configured sequentially as COM1, COM2, COM3 or COM4. At least one of these ports has to be defined in the CIS table and here it is anticipated that the modems 20 are PC compatible, otherwise the card will be rejected. This design reduced essentially the procedure related to the CIS control without therefore missing too much in flexibility. Moreover, the problem with wrongly defined I/O address blocks (COM port addresses) in CIS is solved, this occurring during modem testing.

The COM port availability is controlled by setting the default configuration, 9600 bps, 8 data bits, no parity, and by controlling then the Transmitting Holding Register Empty in line register (THRE) status register. This is to be set to a logical 1, if the UART unit is accessible and is initiated. To avoid volatile or occasional streams in data line buses a pull-down resistor is connected to the data line corresponding to the THRE bit status register.

If none of the four COM ports is active, the adapter 10 repeats five times the communication card configuration and the UART configuration in the present embodiment. If eventually an active communication port is detected a welcoming melody is played during about one second, whereafter the communication card 20 is assumed to be ready to communicate. Otherwise, a specific refusing signal is sent, e.g. three short tones, the adapter 10 entering a waiting loop scanning the card removal.

The microprocessor 12 comprises furthermore means generating signals for automatic data and command transmission maintenance and control for a following activation of another adapter mode according the following:

- a mode with automatic adapter activating means during card insertion and power on,
- a mode with means for detecting inserted cards and command reception from a connected host unit 18,
- a mode with means for reading the communication card CIS table (Card Information Structure, the CIS table comprises a data structure stored in a communication card and contains information of the card capacity as well as of the data formatting and organisation, CIS data are stored in a so-called attribute memory in the communication card),
- a mode with devices for a CIS control according to the above described method with a zero tuple,
- a mode with means for a control, if the communication card is answering signals from a host unit communication port,
- a mode with means for monitoring of data signals sent to the host unit 18 and the card 20, respectively.

The adapter comprises furthermore means with specific functions. The mode above with means being activated in the adapter by means of signalling between activated modes and modes to be activated is explained in detail here below with reference to FIG. 2.

Said means being comprised in the adapter 10 may be registers, timers, comparators, detectors, signal emitters, etc. which actually may consists of a firmware in the microcomputer 12, but still with the signalling with an activation of the means provided by means of the microcomputers 12 hardware.

Figure 2:
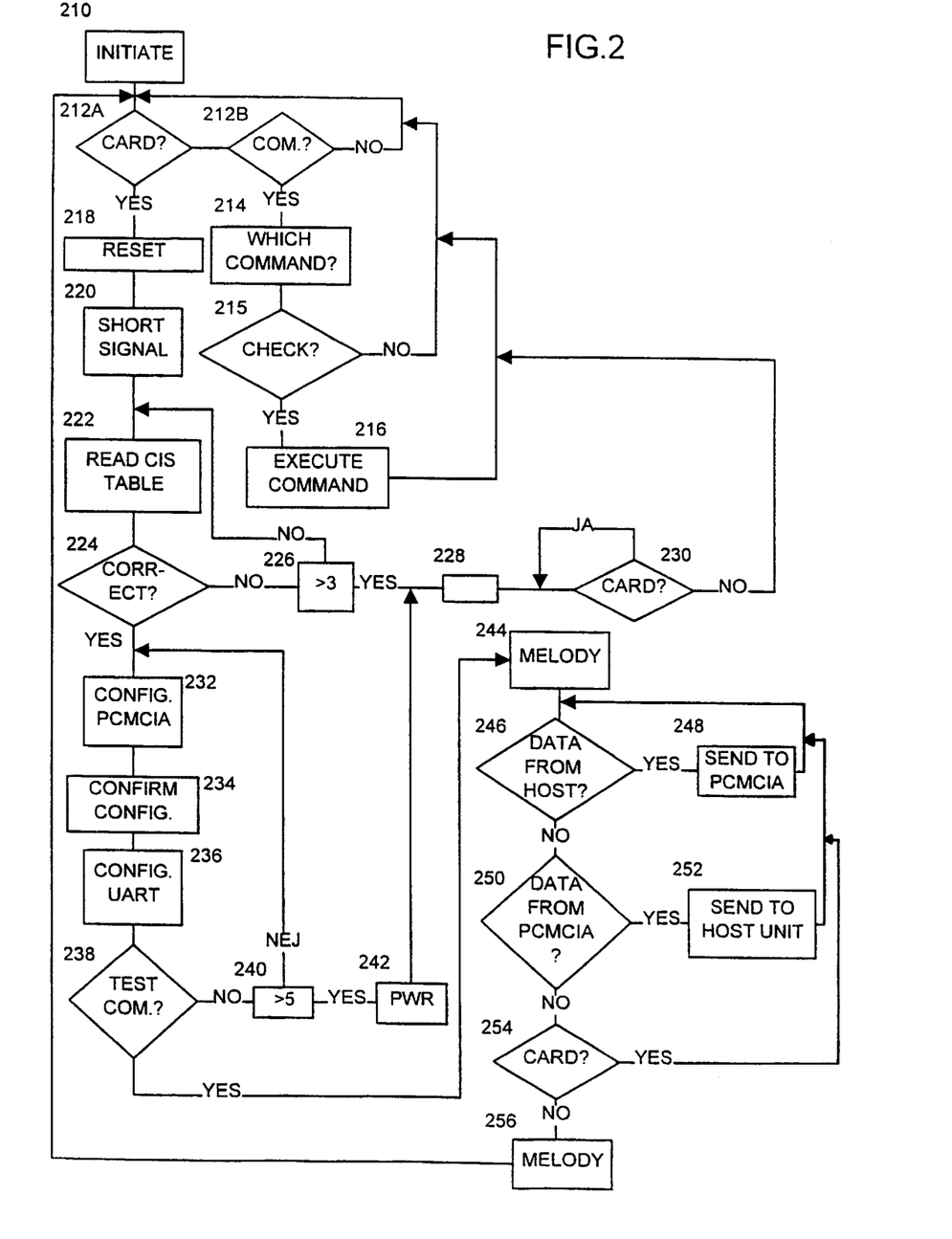
FIG. 2 shows a flow-chart of the functioning of the adapter in one embodiment according to the invention.

FIG. 2 shows a flow chart of the functioning of the adapter according to the invention for a specific embodiment. The adapter passes and is situated in special functional modes being indicated by reference numbers in FIG. 2. Furthermore, the adapter starting from the functional mode, in which it at present is situated, operates sequentially in the flow diagram from the actually activated mode, the above mentioned modes then being sequentially activated in the flow chart from the preceding activated mode.

With the adapter connected to a power source (an internal battery, power supply from the host unit, net connection) and the power source connected by means of a so-called power on, by means of e.g. a switch, the adapter controlled by the processor is activated to initiate 210 communication with the host unit connected. The initiating mode 210 is terminated by the adapter sending a command signal, a prompt, to the host unit when it is ready to receive a new command.

A detecting mode detects 212A if a PCMCIA card is inserted in the adapters card holder or if a command 212B has been sent from the host unit to the adapter. If no card or command is detected the adapter is put into a waiting position, when the NO-loop in the detecting mode is passed until a card or a command is detected.

When a command is detected the adapter 214 controls, if the command is available in a command set-up (table, list) and in the mode 215 it is decided, if the command is enabled, i.e. enabled for an external adapter user by means of the host unit or if it is actually faulty. If the command is not allowable the detecting mode 212A, 212B is again activated. With a recognised enabled command 216 it is executed and the adapter is activated to enter the detecting mode 212A, 212B.

In detecting 212A of a inserted PCMCIA card the mode 218 is activated and the card is reset preparing for an adapter configuration with the necessary parameters, whereafter the mode 220 is activated and emits a short signal indicating that a card has been inserted in the card holder. Then the mode 222 is activated with the adapter CIS table being read or collected from the PCMCIA cards attribute memory. If the CIS table is not accepted or confirmed a counter 226 is activated, in the preferred embodiment counting and allowing the CIS table to bee read and controlled three times as above. After three faulty CIS readings three signals are emitted by means of a mode 228 indicating that the card insertion is rejected. The adapter then enters a waiting loop 230 scanning if the card remains in the adapter card holder or if it has been removed. When the card is removed, the waiting mode terminates and the detecting mode is entered again as above.

With the CIS table accepted a mode 232 is entered with the PCMCIA card being configured by means of the configuration register on base of the CIS information.

Thereafter a mode 234 is started with a two seconds delay and a light diode on the adapter flashes to indicate a successful configuration of the PCMCIA card. In the following mode 236 the UART unit is configured with i.a. parameters for a serial communication.

The next mode 238 has the object to test or to scan any of the host unit ports, e.g. Com1, Com2, etc. if the host unit is a PC-unit, if they answer any calling from the adapter.

In case a communication port does not answer the mode 232 is activated for a PCMCIA configuration of a counter allowing 5 times at the most a PCMCIA configuration with the following mode as above, then after a fifth attempt a mode 242 is entered to indicate power source off and the PWR diode on for the power source is turned off. The turning off of the diode activates the mode 228 indicating that the card insertion is rejected, the waiting loop 230 then being entered as above. As soon as the card is removed from the adapters card holder the detecting mode 212A, 212B is entered.

When a called or scanned communication port answers a mode 244 is activated with a welcome melody being played, whereafter the mode 246 is entered and controls if there are any data from the host unit. If data are detected this is sent to the PCMCIA-unit to be treated by means of the mode 248, the mode 246 then being activated again and controlling if there are any data from the host unit.

The lack of data from the host unit activates the mode 250 detecting or scanning if there are any data from the PCMCIA card, and if so the mode 252 is initiated sending data to the host unit, the mode 246 then being activated again and controlling if there are any data from the host unit.

The mode 254 is activated, if there are no data from the PCMCIA card and it is also controlled, if the card is still inserted. With an inserted card the mode 246 is activated again scanning data from the host unit. If however the card has been removed a mode is activated playing a specific melody to indicate a removed card and the detecting mode 212A, 212B is activated.

The present invention has been described by means of preferred embodiments, but is therefore not limited to these. For the man of art further embodiments will be evident from the contents of the attached claims.

We claim:

1. An adapter (10) for a communication card (20) comprising communication electronics, the adapter (10) including intelligence for initiating a card (20) and for an automatic data and command transmission between the card (20) being inserted in the adapter (10) and a host unit (18) and vice versa by means of one of the host units (18) I/O ports, characterized in that it comprises a processor (12) connected to memory units, a timer, a serial communication unit, a device indicating the communication status (21, 22), a serial interface (16) for a connection with the host units I/O port and a card holder (14) for said card (20), the processor (12) furthermore including signal generating meanss for maintaining and controlling an automatic data and command transmission, with changes in data speed possibly occurring during a present transmission, by generating signals from an actually activated adapter mode for a following activation of another adapter mode as follows:

a mode (210) with means for an automatic adapter (10) activation during a power switch-on and a communication initiation between the adapter (10) and the host unit (18), when the adapter (10) is connected together with the host unit (18) by emitting a command signal to the host unit (18), when it is ready to receive a command, during which a mode (212A, 212B) is activated with means for detecting an inserted card (20) and for receiving commands from the host unit (18), initiating the execution of detected received allowable commands according to a table in the memory unit, the detection then again been activated with the command allowable or not, but if a card is detected after its application a card resetting signal is activated, whereafter a mode (224) is activated with a CIS-table in an attribute memory controlling means to control the table for searching after a table entering tuple, it being assumed that the actual CIS-table does not start with zero tuples, this being repeated a predetermined number of times in receiving zero tuples, the adapter (10) then entering a waiting loop and the detecting mode then being activated, if the card (20) is removed from the card holder (14), whereas with the tuples having a zero value the attribute memory is scanned with a predetermined number of bytes not surpassing the total number of bytes accessible in the attribute memory, said table input tuple to be identified within said predetermined number of bytes and the CIS-table then being accepted to be correct, but if the table input tuple is not identified said controlling mode is activated again, if said predetermined number of times have not been repeated, the adapter (10) then entering said waiting loop, but if on the contrary the table input tuple has been identified within said predetermined repetitions the card is configured (232) with the CIS-values by means of a configuration register and a time delay is initiated to prevent any card interlocking, whereafter the serial communication is configured (236), in that a mode (238) is activated with control devices for checking if the card (20) is answering signals from the host units communication ports and the configuration of the serial communication unit is repeated a predetermined number of times, if the card does not answer any signals, and if no answer is received from the signals, the adapter (10) enters said waiting loop, this being interrupted, if the card (20) is removed from the card holder, the detecting mode again being activated but if the card (20) answers to signals, a mode (246, 250,254) is activated with monitoring means to detect, if data signals are sent from the host unit (18) and the card (20), respectively, emitting the data to the card and the host unit, respectively, for a further data management, then after each performed detection in the communication directions, host unit towards card and card towards host unit, respectively, a control performing the end, if the card is still inserted in the card holder unit (14) and if not so, the detecting mode is activated, otherwise the present monitoring mode scanning emitted data is repeated, the adapter simultaneously monitoring and treating bit combinations resembling the command as to its data contents during data transmission.

2. An adapter according to claim 1, characterized in that said bit combinations are stored in a data base in the adapter (10), the adapter comparing these with emitted received bit combination and permitting the bit combination to be transmitted to the card, if a compliance is obtained during the comparison.

3. An adapter according to claim 2, characterized in that it is implied that at least one of the host units (18) communication ports is defined in the CIS table, being also implied the communication card is computer compatible without this being explicitly checked.

4. An adapter according to claim 3, characterized in that it comprises a RAM memory maintaining stored information, inspite of the power supply to the adapter being interrupted, the adapter then retaining the parameter settings intact.

5. An adapter according to claim 4, characterized in that it comprises a built-in battery supply being independent of any external power supply.

6. An adapter according to claim 5, characterized in that it is made power saving by means of a DC/DC-converter.

7. An adapter according to claim 6, characterized in that monitoring signals are emitted by said communication status device for specific adapter modes to indicate operations in the adapter requiring a users attention by means of LED indication and acoustic signals from a loudspeaker incorporated in the adapter.

8. A method for adapter communication with an adapter for a communication card (20) comprising communication electronics, the adapter (10) including initiating intelligence for a card (20) and for an automatic data and command transmission between the card (20) being inserted in the adapter (10) and a host unit (18) and vice versa by means of one of the host units (18) I/O ports, characterized in that the adapter comprises a processor (12) connected to memory units, a timer, a serial communication unit, a means indicating the communication status (21, 22), a serial interface (16) for a connection with the host units I/O port and a card holder (14) for said card (20), the processor (12) furthermore including signal generating means for maintaining and controlling an automatic data and command transmission, with changes in data speed possibly occurring during a present transmission, by generating signals from an actually activated adapter mode for a following activation of another adapter mode as follows:

a mode (210) for an automatic adapter (10) activation during a power switch-on and a communication initiation between the adapter (10) and the host unit (18), when the adapter (10) is connected to the host unit (18) by emitting a command signal to the host unit (18), when it is ready to receive a command, during which a mode (212A, 212B) is activated for detecting an inserted card (20) and for receiving commands from the host unit (18), initiating the execution of detected received allowable commands according to a table in a memory unit, the detection then again been activated with the command allowable or not, but if a card is detected after its application a card resetting signal is activated, whereafter a mode (224) is activated for controlling a CIS-table in an attribute memory on the card (20) to control the table for searching after a table entering tuple, it being assumed that the actual CIS-table in the attribute memory does not start with zero tuples, this being repeated a predetermined number of times in receiving zero tuples, the adapter (10) then entering a waiting loop and the detecting mode then being activated, if the card (20) is removed from the card holder (14), whereas with the tuples not having a zero value the attribute memory is scanned with a predetermined number of bytes not surpassing the total number of bytes accessible in the attribute memory, said table input tuple must be identified within said predetermined number of bytes and the CIS-table then being accepted to be correct, but if the table input tuple is not identified said controlling mode is activated again, if said predetermined number of times have not been repeated, the adapter (10) then entering said waiting loop, but if on the contrary the table input tuple has been identified within said predetermined repetitions the card is configured (232) with the CIS-values by means of a configuration register and a time delay is initiated to prevent any card interlocking, whereafter the serial communication is configured (236), in that a mode (238) is activated to control, if the card (20) is answering signals from the host units communication ports and the configuration of the serial communication unit is repeated a predetermined number of times, if the card does not answer any signals, and if no answer is received from the signals, the adapter (10) enters said waiting loop, this being interrupted, if the card (20) is removed from the card holder, the detecting mode again being activated but if the card (20) answers to signals, a mode (246, 250,254) is activated for monitoring, if data signals are sent from the host unit (18) and the card (20), respectively, emitting the data to the card and the host unit, respectively, for a further data management, then after each performed detection in the communication directions, host unit towards card and card towards host unit, respectively, a control performing the end, if the card (20) is still inserted in the card holder unit (14) and if not so, the detecting mode is activated, otherwise the present monitoring mode scanning emitted data is repeated, the adapter simultaneously monitoring and managing bit combinations resembling the command as to its data contents during data transmission.

9. A method according to claim 8, characterized in that bit combinations are stored in a data base in the adapter (10), the adapter comparing these with emitted received bit combination and permitting the bit combination to be transmitted to the card, if a compliance is obtained during the comparison.

10. A method according to claim 9, characterized in that at least one of the host units (18) communication ports is defined in the CIS table, being also implied that the communication card is PC compatible without this being explicitly checked.

11. A method according to claim 10, characterized in that it comprises a RAM memory maintaining stored information, inspite of the power supply to the adapter being interrupted, the adapter then reattaining the parameter settings intact.

12. A method according to claim 11, characterized in that the adapter comprises a built-in battery supply being independent of any external power supply.

13. A method according to claim 12, characterized in that the adapter is made power saving by means of an inserted DC/DC-converter.

14. A method according to claim 13, characterized in that monitoring signals are emitted by said communication status device for specific adapter modes to indicate operations in the adapter requiring a users attention by means of a LED indication and acoustic signals from a loudspeaker incorporated in the adapter.

15. An adapter (10) for a communication card (20) comprising communication electronics, the adapter (10) including initiating intelligence for a card (20) and for an automatic data and command transmission between the card (20) being inserted in the adapter (10) and a host unit (18) and vice versa by means of one of the host units (18) I/O ports, characterized in that it comprises a processor (12) connected to memory units, a timer, a serial communication unit, a means indicating the communication status (21, 22), a serial interface (16) for a connection with the host units I/O port and a card holder (14) for said card (20), the processor (12) furthermore including signal generating means for maintaining and controlling an automatic data and command transmission, with changes in data speed being during a present transmission supported by a AT command set-up.

16. An adapter according to claim 15, characterized in that all data format transmission possibly misinterpreted are controlled against a data base or a table.

* * * * *